(12) United States Patent
Beene et al.

(10) Patent No.: US 8,085,912 B1
(45) Date of Patent: *Dec. 27, 2011

(54) SYSTEM AND METHOD FOR REDUCING TOLL CHARGES TO A CUSTOMER SERVICE CENTER USING VOLP

(75) Inventors: Jerry Scott Beene, Bulverde, TX (US); Joel Fred King, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 1258 days.

This patent is subject to a terminal disclaimer.

(21) Appl. No.: 11/319,837

(22) Filed: Dec. 28, 2005

(51) Int. Cl.
*H04M 15/00* (2006.01)

(52) U.S. Cl. ............... 379/114.02; 379/221.01; 370/356

(58) Field of Classification Search ............ 379/220.01, 379/221.13, 114.02, 266.09, 265.09
See application file for complete search history.

(56) References Cited

U.S. PATENT DOCUMENTS

| | | | |
|---|---|---|---|
| 5,590,182 A | 12/1996 | Stevens et al. ................ 379/130 |
| 5,781,620 A | 7/1998 | Montgomery et al. .. 379/114.02 |
| 5,790,642 A * | 8/1998 | Taylor et al. ............. 379/114.02 |
| 5,878,126 A | 3/1999 | Velamuri et al. |
| 6,011,844 A | 1/2000 | Uppaluru et al. ........ 379/220.01 |
| 6,078,652 A | 6/2000 | Barak |
| 6,201,804 B1 | 3/2001 | Kikinis ......................... 370/352 |
| 6,205,211 B1 * | 3/2001 | Thomas et al. .......... 379/114.06 |
| 6,493,447 B1 | 12/2002 | Goss et al. ............... 379/265.09 |
| 6,542,588 B1 * | 4/2003 | Mashinsky ............... 379/114.02 |
| 6,614,781 B1 | 9/2003 | Elliott et al. ................... 370/352 |
| 6,646,990 B1 | 11/2003 | Gray et al. .................... 370/238 |
| 6,907,031 B1 | 6/2005 | Ehlinger et al. .............. 370/352 |
| 7,016,343 B1 | 3/2006 | Mermel et al. |
| 7,042,999 B2 | 5/2006 | Goldstein et al. |
| 7,072,454 B1 | 7/2006 | Ward |
| 7,298,834 B1 * | 11/2007 | Homeier et al. ......... 379/202.01 |
| 7,391,761 B1 | 6/2008 | Ruckart et al. |
| 7,738,646 B2 * | 6/2010 | Sundaram et al. ....... 379/220.01 |
| 7,760,711 B1 * | 7/2010 | Kung et al. .................... 370/352 |
| 2002/0044635 A1 | 4/2002 | Klug |
| 2002/0176405 A1 | 11/2002 | Aijala ........................... 370/352 |
| 2004/0003070 A1 * | 1/2004 | Fernald et al. ................ 709/223 |
| 2004/0022237 A1 * | 2/2004 | Elliott et al. .................. 370/356 |
| 2004/0151293 A1 | 8/2004 | Jensen et al. |
| 2004/0213392 A1 | 10/2004 | Crockett et al. ......... 379/114.01 |
| 2004/0218748 A1 | 11/2004 | Fisher |
| 2005/0220288 A1 | 10/2005 | Huey |
| 2005/0278262 A1 | 12/2005 | Cheliotis et al. |
| 2006/0109971 A1 | 5/2006 | Ekstrom et al. |
| 2007/0064685 A1 | 3/2007 | Crockett et al. |

(Continued)

OTHER PUBLICATIONS

Drew, P. et al., "Next-Generation VoIP Network Architecture," Mutliservice Switching Forum, Mar. 2003, 1-19.

(Continued)

*Primary Examiner* — Ahmad Matar
*Assistant Examiner* — Oleg Asanbayev
(74) *Attorney, Agent, or Firm* — Brooks, Cameron & Huebsch PLLC.

(57) ABSTRACT

A method and system are disclosed where a call center operator having multiple locations, including a call center is able to utilize existing network infrastructure to route telephone communications to the call center to the location where the lowest toll rate is applicable. The telephone communications are converted into data packets and routed to the call center using VoIP technology. No toll would apply to the transmission of the data to the call center.

18 Claims, 3 Drawing Sheets

U.S. PATENT DOCUMENTS

2007/0133775 A1   6/2007   Winkler
2007/0253547 A1   11/2007  Sanchez et al.
2008/0019498 A1   1/2008   Ekstrom et al.
2008/0101567 A1   5/2008   Baudino et al.

OTHER PUBLICATIONS

"Investigation as to Whether Certain Calls are Local and Independent Telephone Companies and Competitive Local Exchange Carriers—Local Calling Areas," Sep. 16, 2005, *Order No. 24,514, DT 00-223 and DT 00-054*, 1-6.

Kuhn, R. et al., "Security Considerations for Voice Over IP Systems: Recommendations of the National Institute of standards and Technology," *National Institute of Standards and Technology; Technology Administration, U.S. Department of Commerce*, Jan. 2005, *NIST SP 00-58*, 1-93.

"VoIP/Internet Voice," FCC Consumer Facts, Mar. 2006, 3 pages.

Waldron, G. et al., "Voice-over-IP: The Future of Communications," *Global Internet Policy Initiative: A Project of Internews and the Center for Democracy and Technology*, Apr. 29, 2002, 1-11.

\* cited by examiner

SYSTEM AND METHOD FOR REDUCING TOLL CHARGES TO A CUSTOMER SERVICE CENTER USING VOLP

CROSS REFERENCE TO RELATED APPLICATIONS

This application is related by subject matter to the subject matter disclosed in the following commonly assigned applications, the entirety of which are hereby incorporated by reference herein: U.S. patent application Ser. No. 11/319,959, now U.S. Pat. No. 7,668,308, filed on same date herewith and entitled "SYSTEM AND METHOD FOR REDUCING TOLL CHARGES TO A CUSTOMER SERVICE CENTER USING VOIP"; and U.S. patent application Ser. No. 11/319,958, now U.S. Pat. No. 7,492,879, filed on same date herewith and entitled "SYSTEM AND METHOD FOR REDUCING TOLL CHARGES TO A CUSTOMER SERVICE CENTER USING VOIP."

TECHNOLOGY FIELD

The present disclosure relates to the field of telecommunications and more particularly to the use of voice over internet protocol (VoIP) to reduce toll charges to customer service centers.

BACKGROUND

The telecommunications industry is a highly regulated industry world wide. The rates charged for telephone call may very substantially because of the many rate setting regulatory entities involved. For example, in the United States a long distance call refers to telephone calls made outside a certain area, typically characterized by an area code outside of a local call area. Such long-distance calls carry long-distance charges (tolls) which may vary by nation and between phone companies. Calls between different countries (international calls) usually carry much higher charges.

In the United States, the regulatory scheme is rather complicated. Each State has a public utilities commission (PUC) that regulates public utilities, and that can, in the case of telephone services, set rates for calls taking place within the State. In addition, there is the concept of Local Access and Transport Area (LATA). A LATA is a "geographical area of the United States under the terms of "the Modification of Final Judgment (MFJ) entered by the United States District Court for the District of Columbia in Civil Action number 82-0192 or any other geographic area designated as a LATA in the National Exchange Carrier Association, Inc. Tariff FCC No. 4." Thus there are two types of "long distance" calls. One is an inter-State call, the other is an intra-State inter LATA. LATA boundaries are usually drawn around markets, not necessarily along existing State or area code borders. Some LATAs cross over State boundaries, and area codes and LATAs do not necessarily share boundaries; many LATAs exist in multiple area codes, and many area codes exist in multiple LATAs.

Intra-State inter-LATA long distance refers to a calling area outside of the customer's local LATA but within the customer's State. The calling area may not served by the same carrier used for regular long distance, or may be provided at different rates. Typically, an intra-State inter-LATA long distance can be billed at a higher per-minute rate than inter-State long-distance calls, despite being a shorter distance.

Many companies operate customer service centers where customers can call for information, product support or to initiate a transaction. Typically, these customer service centers operate as a call center or centralized office that answers incoming telephone calls from customers. Call centers operated by a company may be at a single location, or be linked with other centers. Call centers may also be linked to corporate computer networks. The call center may be accessed through a toll-free telephone number so that the calling party is not charged for the call by the carrier. Instead the company operating the call center pays the charges. When a toll free number is dialed the carrier determines where the actual physical destination by using the intelligent network capabilities embedded into the network. The toll-free number is translated into a regular geographic number and routed by the telephone exchange in the normal way. In a call center the call is then typically answered by a telephone system known as an automatic call distributor (ACD) or private branch exchange (PBX). Subsequent routing of the calls are determined by the call center. For example, the call may routed depending upon the location of the caller. Many companies take advantage of the difference in inter-State rates versus intra-State inter-LATA rates by routing call out of State where the rates may be less.

Companies having call centers have a need to take advantage of existing network infrastructure to ensure that toll calls are routed though the lowest cost locations in their system. There is also a need to integrate voice and data communication networks into the operations of call centers to derive the maximum economic benefit.

SUMMARY

Accordingly, a system and method is disclosed for managing voice transmissions in a telecommunication system. The method includes the steps of routing voice transmissions directed to a first destination, to a location where the lowest toll would apply. The voice transmissions are converted into data packets and rerouted back to the first destination over an IP network, where the data packets are converted back to voice signals.

The system includes an IP network connecting a data network in the first destination to the location where the lowest toll would apply. VoIP technology is used to convert the voice communication to data packets that can be transmitted to the first destination. The system and method enable calls to call centers to be accomplished at the lowest rate.

BRIEF DESCRIPTION OF THE DRAWINGS

A more complete appreciation of the system and method and many of the attendant advantages thereof will be readily obtained as the same becomes better understood by reference to the following detailed description when considered in connection with the accompanying drawing; it being understood that the drawings contained herein are not necessarily drawn to scale; wherein.

DETAILED DESCRIPTION OF ILLUSTRATIVE EMBODIMENTS

Figure 1:
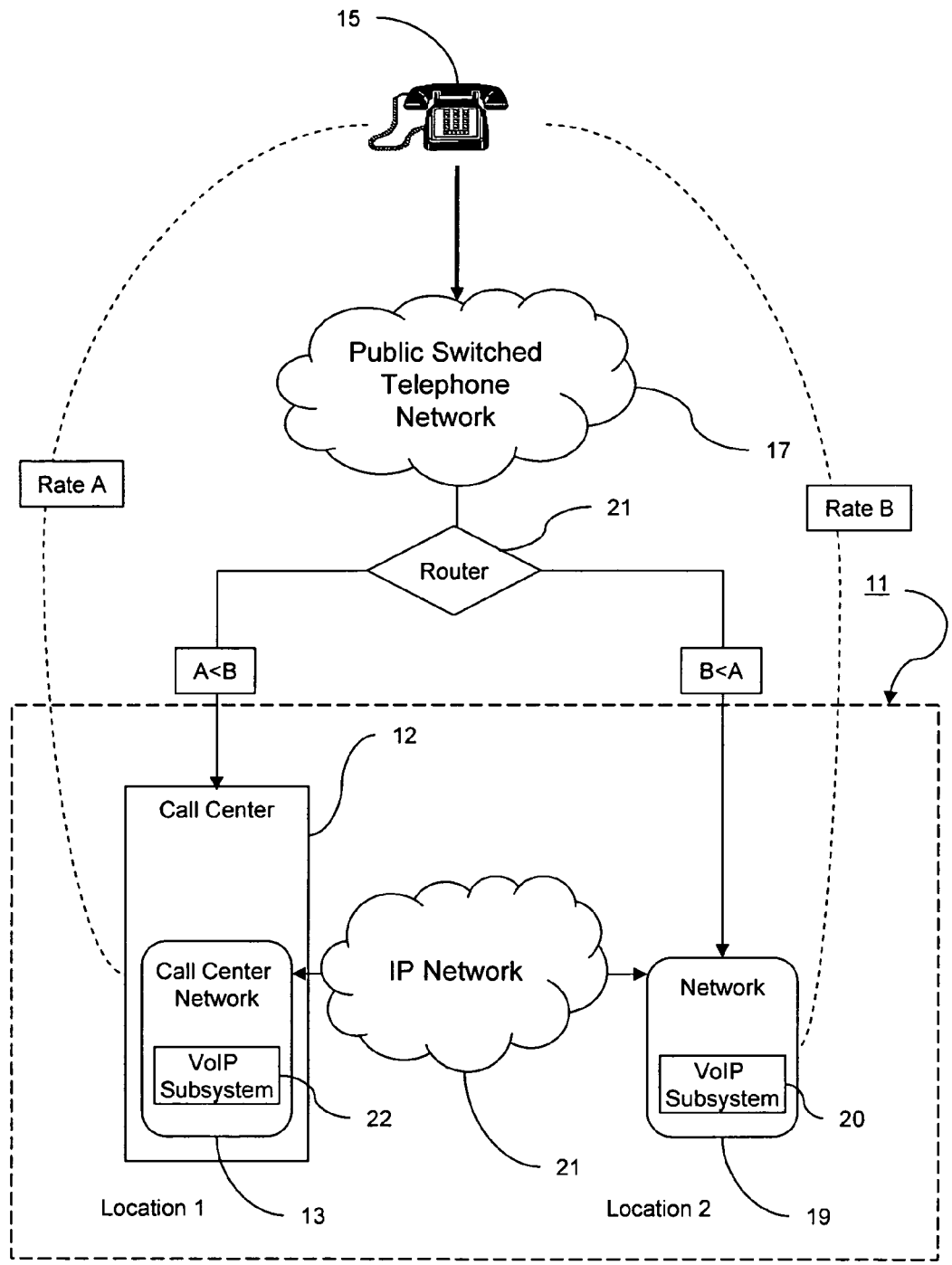
FIG. 1 a high-level illustration of the system for reducing toll charges.

Illustrated in FIG. 1 is a system 11 for reducing toll charges to a customer service center in accordance with this disclosure. The system 11 includes a call center 12 having a first local network (call center network) 13 at location 1, that operates as a call center to respond to calls placed by a customer from a customer telephone 15, through a public switched telephone network (PSTN) 17. The system 11 also includes at least one other local network 19 at location 2 that can receive and process calls from PSTN 17. A voice over internet protocol (VoIP) subsystem 20 is included in the network 19. Network 19 and call center network 13 are connected through a packet switched network 21. Examples of packet switched networks include the internet and private networks that carry data in Transmission Control Protocol/Internet Protocol (TCP/IP). TCP/IP is a set of communications protocols used to connect hosts on the Internet. TCP/IP uses several protocols including TCP and IP. TCP/IP is the de facto standard for transmitting data over networks. A protocol is an agreed format for transmitting data between two devices that determines the type of error checking to be used; data compression method, if any; how the sending device will indicate that it has finished sending a message; how the receiving device will indicate that it has received a message. Clearly there are a number of standard protocols from which programmers can choose. Each has particular advantages and disadvantages.

The system 11 operates in an environment that includes PSTN 17 and a call router 21. The call router 21 routes the call depending on the nature of the call. It should be noted that Area Code Routing (i.e. routing toll-free calls based on the area code of the caller) is a service that is provided by most carriers. So the call router 21 may be operated by the carrier and may be part of the PSTN 17. If the Rate A applicable to calls from customer telephone 15 to call center 12 is lower than the rate B applicable to calls from customer telephone 15 to location 2 then the router would route the call to call center 12. If the Rate B applicable to calls from customer telephone 15 to Location 2 is lower than the rate A applicable to calls from customer telephone 15 to location 1 then the router would route the call to network 19. If the call is routed to Network 19, then a VoIP subsystem 20 would receive the call and convert the voice communication of the call into data packets (using existing VoIP technology) that would be transmitted over the packet switched network 21 to call center network 13.

Voice over Internet Protocol is the routing of voice conversations over the Internet or any other IP-based network. The voice data flows over a general-purpose packet-switched network, instead of traditional dedicated, circuit-switched voice transmission lines. In packet switching, packets (units of information carriage) are individually routed between nodes over data links which might be shared by many other nodes. Packet switching results in the optimization of bandwidth available in a network, and minimizes the time it takes for data to pass across the network. In a packet switched network, a stream of data (e.g. voice transmissions) is broken up into smaller groups of data known as packets. Packets include information about the origin, destination and sequence of the original data. The sequence is needed for re-assembly, at the files destination.

Protocols used to carry voice signals over the IP network are commonly referred to as Voice over IP or VoIP protocols. VoIP traffic might be deployed on any IP network, including the Internet or a private IP network. In general, phone service via VoIP costs less than equivalent service from traditional sources.

An example of such a system 11 would be a call center 12 located in Tampa, Fla. and a network 19 located at a corporate headquarters in San Antonio, Tex. Calls made by customer telephone 15 located in Miami, Fla. to call center 12 located in Tampa, would be charged at a higher rate than calls made from Miami, Fla. to San Antonio, Tex. If the carrier determines that the call is coming from a customer in Miami, then the call would be routed to the network 19 in San Antonio (Location 2). The call would be received by the VoIP subsystem 20 on the network 19 and the voice signal of the call would be converted to IP packets and transmitted over the packet switched network 21 to the call center 12 in Tampa where they are received and handled by a VoIP telephone receiver.

Figure 2:
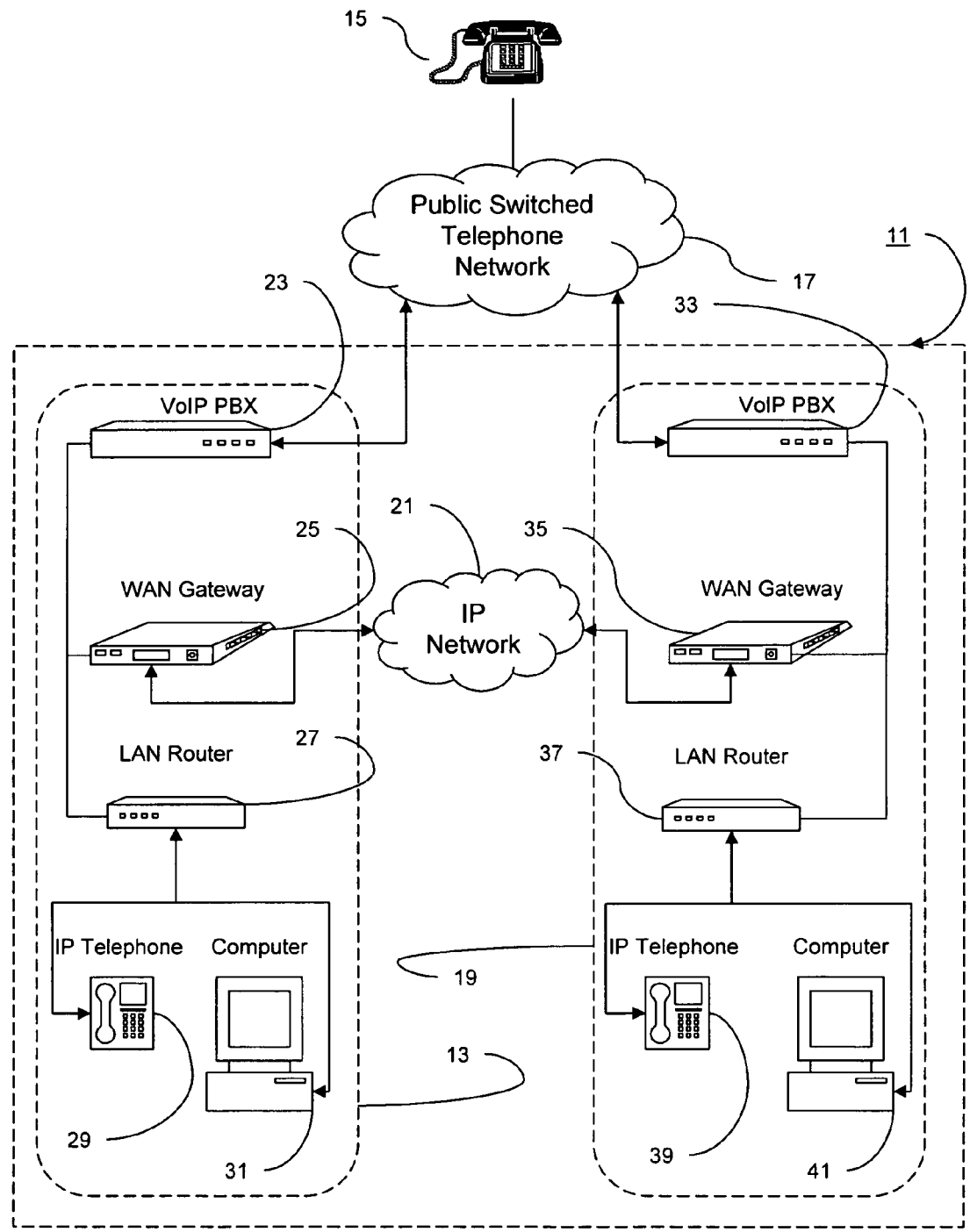
FIG. 2 a more detailed illustration of the system for reducing toll charges and their components.

FIG. 2 provides a more detailed illustration of the components of the system 11. As illustrated in FIG. 2, the call center network 13 may include a Voice over IP private branch exchange (VoIP PBX) 23. VoIP PBX 23 interoperates with most SIP telephones, acting both as registrar and as a gateway between IP phones and the PSTN 17. Like any PBX, VoIP PBX 23 allows a number of attached telephones to make calls to one another, and to connect to other telephone services including the PSTN. Although in this example reference is made to a VoIP PBX a regular PBX that has been IP-enabled, or a server running specialized software would also be able to provide the same function. Many commercially available VoIP PBX's include the capability to convert the analog phone signals into digital signals that can be sent over the call center network 13 and the packet switched network 21. The VoIP PBX 23 may support a wide range of Voice over IP protocols, including SIP and H.323. The call center network 13 also may include at least one wide area network (WAN) gateway 25. WAN gateway 25 is a network node equipped for interfacing with the packet switched network 21. The WAN gateway may contain devices such as protocol translators, impedance matching devices, rate converters, fault isolators, or signal translators as necessary to provide system interoperability.

The call center network may also include one or more local area network (LAN) router 27, a plurality of telephones 29 and a plurality of work stations computers 31. LAN router 27 directs the traffic of the data packets within call center network 13. Telephones 29 may be VoIP telephones or may combine VoIP and analog phone functions in a single device.

Network 19 has similar basic representative components, including a VoIP PBX 33 (or equivalent), a WAN gateway 35 (or equivalent device to connect to the packet switched network 21); a LAN router 37, telephones 19 and computers 41. In operation, voice data from a call routed to the network 19 would be converted into data packets by VoIP PBX 33 and transmitted over the packet switched network 21 to the call center network 13. VoIP PBX 23 would route the data to the IP telephone 29 of the appropriate customer representative, where the data would be converted to voice signals. Similarly voice signals for the customer representative using telephone 29 would be converted to data packets transmitted though the packet switched network 21, converted back to voice signals in network 19 and routed though the PSTN network 17 to the customer using customer telephone 15.

Figure 3:
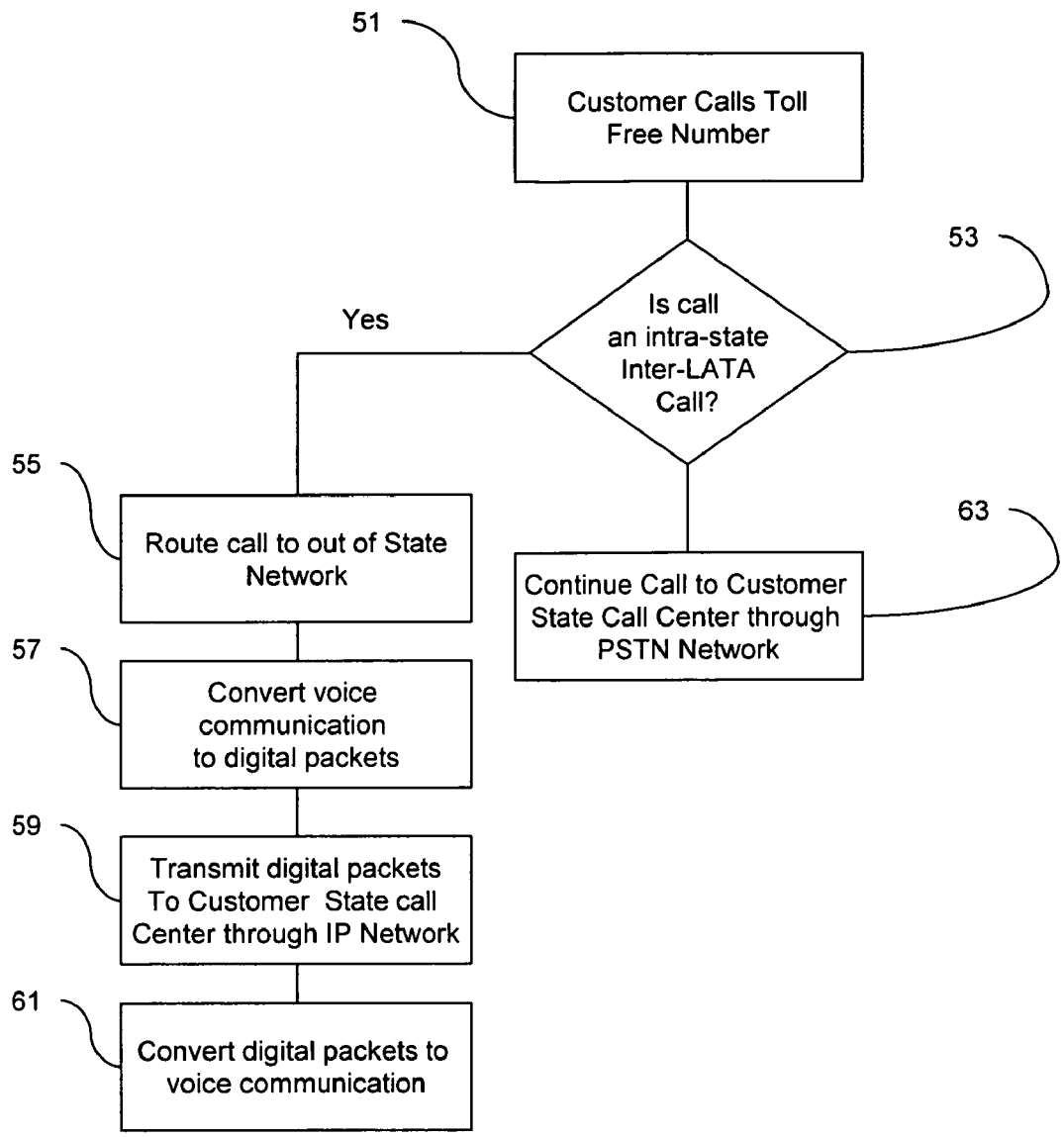
FIG. 3 is a flow diagram of the method for reducing toll charges.

FIG. 3 is a flow diagram of the process implemented by the system in the United States. A customer places a call to a 1-800 number in step 51. The carrier determines which the network that will receive the call in step 53. If the caller and the call center are in the same State and LATA the call would be routed to an out of State network in step 55. The out of State network would convert the analog (or digital) voice communication into digital packets usually thorough the VoIP PBX. The VoIP PBX would route the packets thorough the IP network to the call center in step 59. The packets would then be converted to analog signals in step 61. The end result is that an intra-State Inter LATA call is accomplished at inter-State rates. Although in this example the regulatory scheme applicable to the United States is described, this process would also work where there is a discrepancy in the rates applicable for PSTN calls between any two locations, such as two countries.

It should be understood that the present system and method may utilize any number of hardware components and that the present system and method is not limited to those explicitly described herein.

Although the system and method have been described with reference to specific embodiments, this description is not meant to be construed in a limited sense. Various modifications of the disclosed embodiments, as well as alternative embodiments of the system and method, will become apparent to persons skilled in the art upon reference to the detailed description. It is, therefore, contemplated that the appended claims will cover such modifications that fall within the scope of the description.

What is claimed is:

1. A telecommunication system for voice transmission from a first location to a second location and a third location over a toll network, said second location being connected through a packet switched network to the third location, comprising at least one subsystem that:
   receives, via the toll network, at the third location a subset of all voice transmissions made from the first location to the second location, the subset being those having a lower per-minute billing rate for use of the toll network for voice transmissions originated from the first location and completed at the third location than for voice transmissions originated from the first location and completed at the second location despite the first location being more distant from the third location than from the second location, where the second location is a call center network that responds to calls placed by a customer at the first location, and where said first and third locations are in different countries and said subsystem that receives at the third location the subset of all voice transmissions comprises at least one subsystem that receives only those voice transmissions where the first location and the second location are in the same country;
   redirect the voice transmission to the third location only if the voice transmission to the second location bears a higher toll than the voice transmission to the third location;
   converts the subset of voice transmissions to data packets at the third location;
   connect with the packet switch network at the third location;
   transmits the data packets to the second location over the packet switched network; and
   transforms the data packets to the voice transmissions at the second location.

2. The telecommunication system of claim 1 wherein said subsystem that converts the subset of voice transmissions comprises at least one subsystem that converts analog voice signals to digital data and converts the digital data into data packets.

3. The telecommunication system of claim 1 wherein said subsystem that transmits the data packets to the second location comprises at least one subsystem that transmits the data using TCP/IP protocol.

4. The telecommunication system of claim 1 wherein said subsystem that receives at the third location a subset of all voice transmissions comprises at least one VoIP PBX subsystem.

5. The telecommunication system of claim 1 wherein said first and third locations are in different States within the United States and said subsystem that receives at the third location a subset of all voice transmissions comprises at least one subsystem that receives only those voice transmissions where the first location and the second location are in the same State.

6. The telecommunication system of claim 5 wherein said subsystem that receives only those voice transmissions where the first location and the second location are in the same State comprises at least one subsystem that receives only voice transmissions where the first and second locations are in the same State and in different Local Access and Transport Areas (LATAs).

7. A method for transmitting voice communications from a first location to a second location and a third location over a toll network, said second location being connected through a packet switched network to the third location, comprising:
   receiving, via the toll network, at the third location a subset of all voice transmissions made from the first location to the second location, the subset being those having a lower per-minute billing rate for use of the toll network for voice transmissions originated from the first location and completed at the third location than for voice transmissions originated from the first location and completed at the second location despite the first location being more distant from the third location than from the second location, where the second location is a call center network that responds to calls placed by a customer at the first location, and where said first and third locations are in different countries and said method step for receiving at the third location the subset of all voice transmissions comprises receiving only those voice transmissions where the first location and the second location are in the same country;
   redirecting the voice transmission to the third location only if the voice transmission to the second location bears a higher toll than the voice transmission to the third location;
   converting the subset of voice transmissions to data packets at the third location;
   connecting with the packet switch network at the third location;
   transmitting the data packets to the second location over the packet switched network; and
   transforming the data packets to the voice transmissions at the second location.

8. The method of claim 1 wherein said method element for converting the subset of voice transmissions comprises converting analog voice signals to digital data and converting the digital data into data packets.

9. The method of claim 7 wherein said method element for transmitting the data packets to the second location comprises transmitting the data using TCP/IP protocol.

10. The method of claim 7 wherein said method element for receiving at the third location a subset of all voice transmissions comprises at least one VoIP PBX subsystem.

11. The method of claim 7 wherein said first and third locations are in different States within the United States and said method step for receiving at the third location a subset of all voice transmissions comprises receiving only those voice transmissions where the first location and the second location are in the same State.

12. The method of claim 11 wherein said method step for receiving only those voice transmissions where the first location and the second location are in the same State comprises receiving only those voice transmissions where first location and the second location are in the same State and in different Local Access and Transport Areas (LATAs).

13. A non-transitory computer readable medium comprising computer readable instructions executed by a processor for transmitting voice transmission from a first location to a second location and a third location over a toll network, said second location being connected through a packet switched network to the third location, said computer readable instructions comprising instructions for:

receiving, via the toll network, at the third location a subset of all voice transmissions made from the first location to the second location, the subset being those having a lower per-minute billing rate for use of the toll network for voice transmissions originated from the first location and completed at the third location than for voice transmissions originated from the first location and completed at the second location despite the first location being more distant from the third location than from the second location, where the second location is a call center network that responds to calls placed by a customer at the first location, and where said first and third locations are in different countries and said instructions for receiving at the third location the subset of all voice transmissions comprises instructions for receiving only those voice transmissions where the first location and the second location are in the same country;

redirecting the voice transmission to the third location only if the voice transmission to the second location bears a higher toll than the voice transmission to the third location;

converting the subset of voice transmissions to data packets at the third location;

connecting with the packet switch network at the third location;

transmitting the data packets to the second location over the packet switched network; and transforming the data packets to the voice transmissions at the second location.

14. The computer readable medium of claim 13 wherein said instructions for converting the subset of voice transmissions comprises instructions for converting analog voice signals to digital data and instructions for converting the digital data into data packets.

15. The computer readable medium of claim 13 wherein said instruction for transmitting the data packets to the second location comprises instructions for transmitting the data using TCP/IP protocol.

16. The computer readable medium of claim 13 wherein said instructions for receiving at the third location a subset of all voice transmissions comprises instructions for operating a VoIP PBX subsystem.

17. The computer readable medium of claim 13 wherein said first and third locations are in different States within the United States, and said instructions for receiving at the third location a subset of all voice transmissions comprises instructions for receiving only those voice transmissions where the first location and the second location are in the same State.

18. The computer readable medium of claim 17 wherein said instructions for receiving only those voice transmissions where the first location and the second location are in the same State comprises instructions for receiving only those voice transmissions where first location and the second location are in the same State and in different Local Access and Transport Areas (LATAs).

* * * * *